United States Patent
Shiraishi et al.

(10) Patent No.: US 12,314,925 B2
(45) Date of Patent: May 27, 2025

(54) PROCESSING APPARATUS, PROCESSING METHOD, AND NON-TRANSITORY STORAGE MEDIUM

(71) Applicant: NEC Corporation, Tokyo (JP)

(72) Inventors: Soma Shiraishi, Tokyo (JP); Katsumi Kikuchi, Tokyo (JP); Takami Sato, Tokyo (JP); Yu Nabeto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 261 days.

(21) Appl. No.: 17/925,046

(22) PCT Filed: May 22, 2020

(86) PCT No.: PCT/JP2020/020260
§ 371 (c)(1),
(2) Date: Nov. 14, 2022

(87) PCT Pub. No.: WO2021/234938
PCT Pub. Date: Nov. 25, 2021

(65) Prior Publication Data
US 2023/0186271 A1     Jun. 15, 2023

(51) Int. Cl.
*G06T 7/70*     (2017.01)
*G06Q 20/20*     (2012.01)
(Continued)

(52) U.S. Cl.
CPC .......... *G06Q 20/208* (2013.01); *G06T 7/70* (2017.01); *G06V 10/12* (2022.01); *G06V 10/751* (2022.01); *G06V 10/761* (2022.01); *G06V 10/764* (2022.01)

(58) Field of Classification Search
CPC .. G06Q 20/208; G06Q 20/18; G06Q 30/0201; G06Q 30/0631; G06T 7/70;
(Continued)

(56) References Cited

U.S. PATENT DOCUMENTS 8,189,926 B2 *   5/2012   Sharma ................. G06V 20/52
                                                             382/103
11,042,836 B1 *   6/2021   Goldstein ............ G06Q 10/087
(Continued)

FOREIGN PATENT DOCUMENTS

JP        2013-054673 A      3/2013
JP        2015-210651 A     11/2015
(Continued)

OTHER PUBLICATIONS

International Search Report for PCT Application No. PCT/JP2020/020260, mailed on Aug. 11, 2020.
(Continued)

*Primary Examiner* — Garcia Ade

(57) ABSTRACT

The present invention provides a processing apparatus (10) including: an acquisition unit (11) that acquires a plurality of images, captured by a plurality of cameras, of a product held by a customer with a hand; a detection unit (12) that detects an object from each of the plurality of images; a positional information generation unit (13) that generates positional information indicating a position in the image, for the each detected object; a product kind-related information generation unit (14) that generates product kind-related information that determines a product kind, for the each detected object; an extraction unit (15) that extracts a group of a plurality of objects which satisfies conditions with each other, the conditions being related to the positional information and the product kind-related information; and a product recognition result output unit (16) that outputs a product recognition result for the each extracted group.

9 Claims, 10 Drawing Sheets

(51) Int. Cl.
*G06V 10/12* (2022.01)
*G06V 10/74* (2022.01)
*G06V 10/75* (2022.01)
*G06V 10/764* (2022.01)

(58) Field of Classification Search
CPC .... G06V 10/12; G06V 10/751; G06V 10/761; G06V 10/764; G06V 20/52; H04N 7/18
USPC .......................................................... 705/23
See application file for complete search history.

(56) References Cited

U.S. PATENT DOCUMENTS

| | | |
|---|---|---|
| 11,373,320 B1* | 6/2022 | Le ............................. G06T 7/50 |
| 2015/0019391 A1 | 1/2015 | Kumar et al. |
| 2016/0203499 A1 | 7/2016 | Yamashita et al. |
| 2017/0154424 A1 | 6/2017 | Uchiyama et al. |
| 2018/0232799 A1 | 8/2018 | Kitagawa et al. |
| 2020/0020112 A1 | 1/2020 | Buibas et al. |
| 2020/0402139 A1* | 12/2020 | Higa .................... G06Q 20/201 |

FOREIGN PATENT DOCUMENTS

| | | |
|---|---|---|
| JP | 2016-532932 A | 10/2016 |
| JP | 2017-103602 A | 6/2017 |
| JP | 2018-195965 A | 12/2018 |
| JP | 2020-053019 A | 4/2020 |
| WO | 2015/033577 A1 | 3/2015 |
| WO | 2017/030177 A1 | 2/2017 |
| WO | 2019/171573 A1 | 9/2019 |

OTHER PUBLICATIONS

Takuya Miyata, "Mechanism of Amazon Go, Supermarket without Cash Register Achieved by 'Camera and Microphone'", [online], Dec. 10, 2016, [Searched on Dec. 6, 2019], the Internet<URL: https://www.huffingtonpost.jp/tak-miyata/amazongo_b_13521384. html>.

NEC, Cash Register-less Store NEC Smart Store "is Open in Head Office-Face Recognition Use, Settlement Simultaneously with Exit of Store", [online], Feb. 28, 2020, [Searched on Mar. 27, 2020], the Internet <URL:https://japan.cnet.com/article/35150024/>.

JP Office Action for JP Application No. 2023-201508, mailed on Oct. 15, 2024 with English Translation.

* cited by examiner

FIG. 6

```
FIRST OBJECT INFORMATION

• 1-01
  "POSITIONAL INFORMATION"
  : ($x_{11}$, $y_{11}$), ($x_{12}$, $y_{12}$)

"PRODUCT KIND-RELATED
  INFORMATION" : * * *

• 1-02
  "POSITIONAL INFORMATION"
  : ($x_{21}$, $y_{21}$), ($x_{22}$, $y_{22}$)

"PRODUCT KIND-RELATED
  INFORMATION" : * * *

SECOND OBJECTIVE INFORMATION

- 2-01
  "POSITIONAL INFORMATION"
  : $(x_{31}, y_{31})$, $(x_{32}, y_{32})$

"PRODUCT KIND-RELATED
  INFORMATION" : * * *

- 2-02
  "POSITIONAL INFORMATION"
  : $(x_{41}, y_{41})$, $(x_{42}, y_{42})$

"PRODUCT KIND-RELATED
  INFORMATION" : * * *

| PRODUCT KIND IDENTIFICATION INFORMATION | FEATURE VALUE | | | | | |
|---|---|---|---|---|---|---|
| | FIRST DIRECTION | SECOND DIRECTION | THIRD DIRECTION | FOURTH DIRECTION | FIFTH DIRECTION | SIXTH DIRECTION |
| 00131987 | *** | *** | *** | *** | *** | *** |
| . . . . | . . . . | . . . . | . . . . | . . . . | . . . . | . . . . |

FIG. 10

| FIRST CAMERA | SECOND CAMERA |
|---|---|
| FIRST DIRECTION | THIRD DIRECTION |
| THIRD DIRECTION | FIRST DIRECTION |
| SECOND DIRECTION | FOURTH DIRECTION |
| FOURTH DIRECTION | SECOND DIRECTION |
| FIFTH DIRECTION | SIXTH DIRECTION |
| SIXTH DIRECTION | FIFTH DIRECTION |

PROCESSING APPARATUS, PROCESSING METHOD, AND NON-TRANSITORY STORAGE MEDIUM

This application is a National Stage Entry of PCT/JP2020/020260 filed on May 22, 2020, the contents of all of which are incorporated herein by reference, in their entirety.

TECHNICAL FIELD

The present invention relates to a processing apparatus, a processing method, and a program.

BACKGROUND ART

Non-Patent Documents 1 and 2 disclose a store system that eliminates settlement processing (such as product registration and payment) at a cash register counter. The technique recognizes a product held by a customer with a hand, based on an image being generated by a camera that captures inside of a store, and automatically performs the settlement processing, based on a recognition result at a timing at which the customer leaves the store.

Patent Document 1 discloses an apparatus as follows. First, the apparatus detects a first flying object in a first image acquired from a first camera, and acquires an epipolar line indicating a direction of the first flying object viewed from the first camera. Then, the apparatus controls a second camera in such a way that the second camera performs capturing along the epipolar line. Next, the apparatus detects a second flying object in a second image acquired from the second camera, decides whether the first flying object and the second flying object are the same, and computes a position of the first flying object and the second flying object.

Patent Document 2 discloses a technique for accurately acquiring a three-dimensional position of an object, regardless of the number of cameras in which the object is captured, by switching a method for estimating a three-dimensional position of a person according to a position of a human head in an image acquired from a plurality of cameras.

RELATED DOCUMENT

Patent Document

[Patent Document 1] Japanese Patent Application Publication No. 2018-195965
[Patent Document 2] Japanese Patent Application Publication No. 2017-103602

Non-Patent Document

[Non-Patent Document 1] Takuya MIYATA, "Mechanism of Amazon Go, Supermarket without Cash Register Achieved by 'Camera and Microphone'", [online], Dec. 10, 2016, [Searched on Dec. 6, 2019], the Internet <URL: https://www.huffingtonpost.jp/tak-miyata/amazon-go_b_13521384. html>
[Non-Patent Document 2] "NEC, Cash Register-less Store "NEC SMART STORE" is Open in Head Office—Face Recognition Use, Settlement Simultaneously with Exit of Store", [online], Feb. 28, 2020, [Searched on Mar. 27, 2020], the Internet <URL: https://japan.cnet.com/article/35150024/>

DISCLOSURE OF THE INVENTION

Technical Problem

A technique for accurately recognizing a product held by a customer with a hand is desired. For example, in the store system that eliminates the settlement processing (such as product registration and payment) at a cash register counter described in Non-Patent Documents 1 and 2, a technique for accurately recognizing a product held by a customer with a hand is needed. In addition, when in-store behavior of a customer is investigated for a purpose of a preference investigation of a customer, a marketing investigation, and the like, the technique is also useful.

The present invention has a challenge to provide a technique for accurately recognizing a product held by a customer with a hand.

Solution to Problem

The present invention provides a processing apparatus including:
an acquisition unit that acquires a plurality of images generated by capturing a product held by a customer with a hand by a plurality of cameras from directions different from each other;
a detection unit that detects an object from each of the plurality of images;
a positional information generation unit that generates positional information indicating a position in the image, for the each detected object;
a product kind-related information generation unit that generates, based on the image, product kind-related information that determines a product kind, for the each detected object;
an extraction unit that extracts a group of a plurality of objects detected from the images being generated by the cameras different from each other, the group of the plurality of objects having pieces of the positional information that satisfy a positional condition with each other and also having pieces of the product kind-related information that satisfy a product kind condition with each other; and
a product recognition result output unit that outputs a product recognition result for the each extracted group.

Further, the present invention provides a processing method including,
by a computer:
acquiring a plurality of images generated by capturing a product held by a customer with a hand by a plurality of cameras from directions different from each other;
detecting an object from each of the plurality of images;
generating positional information indicating a position in the image, for the each detected object;
generating, based on the image, product kind-related information that determines a product kind, for the each detected object;
extracting a group of a plurality of objects detected from the images being generated by the cameras different from each other, the group of the plurality of objects having pieces of the positional information that satisfy a positional condition with each other and also having pieces of the product kind-related information that satisfy a product kind condition with each other; and
outputting a product recognition result for the each extracted group.

Further, the present invention provides a program causing a computer to function as:

- an acquisition unit that acquires a plurality of images generated by capturing a product held by a customer with a hand by a plurality of cameras from directions different from each other;
- a detection unit that detects an object from each of the plurality of images;
- a positional information generation unit that generates positional information indicating a position in the image, for the each detected object;
- a product kind-related information generation unit that generates, based on the image, product kind-related information that determines a product kind, for the each detected object;
- an extraction unit that extracts a group of a plurality of objects detected from the images being generated by the cameras different from each other, the group of the plurality of objects having pieces of the positional information that satisfy a positional condition with each other and also having pieces of the product kind-related information that satisfy a product kind condition with each other; and
- a product recognition result output unit that outputs a product recognition result for the each extracted group.

Advantageous Effects of Invention

The present invention achieves a technique for accurately recognizing a product held by a customer with a hand.

BRIEF DESCRIPTION OF THE DRAWINGS

FIG. 6 is a diagram illustrating one example of information processed by the processing apparatus according to the present example embodiment.

FIG. 7 is a diagram illustrating one example of information processed by the processing apparatus according to the present example embodiment.

FIG. 9 is a diagram illustrating one example of information processed by the processing apparatus according to the present example embodiment.

FIG. 10 is a diagram illustrating one example of information processed by the processing apparatus according to the present example embodiment.

DESCRIPTION OF EMBODIMENTS

First Example Embodiment

"Outline"

In the present example embodiment, product recognition processing is performed based on an image generated by a plurality of cameras that capture a product held by a customer with a hand from positions and directions different from each other. Then, only a product recognition result of an object in which analysis results of the images generated by the plurality of cameras match (positions match, appearances match, or the like) is output, and the other product recognition result is rejected, for example. A processing apparatus according to the present example embodiment can suppress false recognition and accurately recognize a product held by a customer with a hand by providing such a condition that "it holds true when analysis results of images generated by a plurality of cameras match (positions match, appearances match, or the like)".

"Hardware Configuration"

Next, one example of a hardware configuration of the processing apparatus will be described.

Each functional unit of the processing apparatus is achieved by any combination of hardware and software concentrating on a central processing unit (CPU) of any computer, a memory, a program loaded into the memory, a storage unit (that can also store a program downloaded from a storage medium such as a compact disc (CD), a server on the Internet, and the like in addition to a program previously stored at a stage of shipping of an apparatus) such as a hard disk that stores the program, and a network connection interface. Then, various modification examples of an achievement method and an apparatus thereof are understood by a person skilled in the art.

Figure 1:
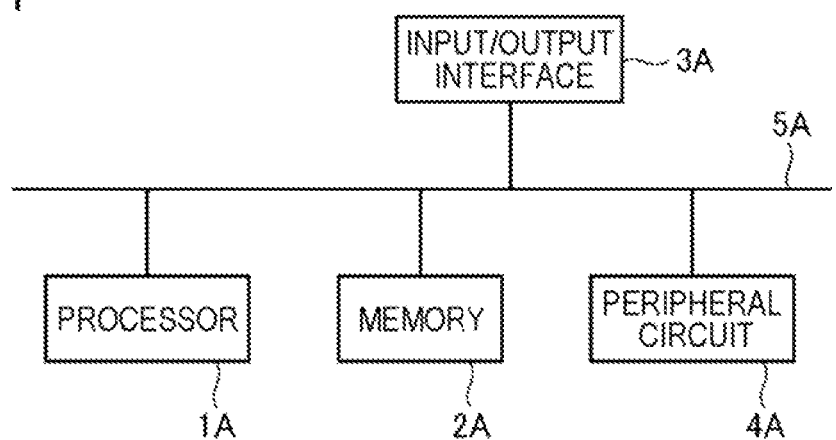
FIG. 1 is a diagram illustrating one example of a hardware configuration of a processing apparatus according to the present example embodiment.

FIG. 1 is a block diagram illustrating a hardware configuration of the processing apparatus. As illustrated in FIG. 1, the processing apparatus includes a processor 1A, a memory 2A, an input/output interface 3A, a peripheral circuit 4A, and a bus 5A. Various modules are included in the peripheral circuit 4A. The processing apparatus may not include the peripheral circuit 4A. Note that, the processing apparatus may be formed of a plurality of apparatuses separated physically and/or logically, or may be formed of one apparatus integrated physically and/or logically. When the processing apparatus is formed of a plurality of apparatuses separated physically and/or logically, each of the plurality of apparatuses can include the hardware configuration described above.

The bus 5A is a data transmission path for the processor 1A, the memory 2A, the peripheral circuit 4A, and the input/output interface 3A to transmit and receive data to and from one another. The processor 1A is an arithmetic processing apparatus such as a CPU and a graphics processing unit (GPU), for example. The memory 2A is a memory such as a random access memory (RAM) and a read only memory (ROM), for example. The input/output interface 3A includes an interface for acquiring information from an input apparatus, an external apparatus, an external server, an external sensor, a camera, and the like, an interface for outputting information to an output apparatus, an external apparatus, an external server, and the like, and the like. The input apparatus is, for example, a keyboard, a mouse, a microphone, a physical button, a touch panel, and the like. The output apparatus is, for example, a display, a speaker, a printer, a mailer, and the like. The processor 1A can output an instruction to each of modules, and perform an arithmetic operation, based on an arithmetic result of the modules.

"Functional Configuration"

Figure 2:
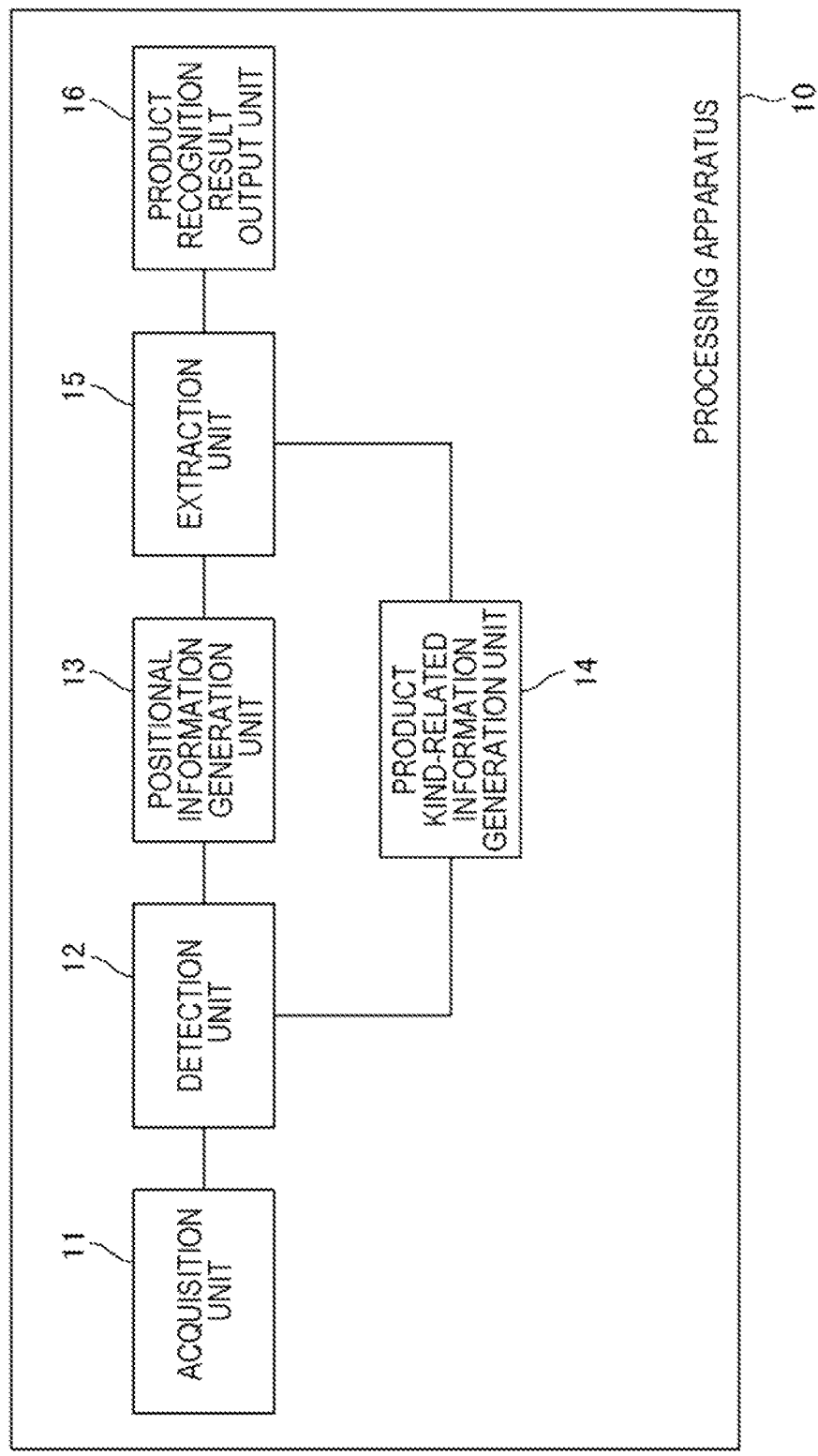
FIG. 2 is one example of a functional block diagram of the processing apparatus according to the present example embodiment.

FIG. 2 illustrates one example of a functional block diagram of a processing apparatus 10. As illustrated, the processing apparatus 10 includes an acquisition unit 11, a detection unit 12, a positional information generation unit 13, a product kind-related information generation unit 14, an extraction unit 15, and a product recognition result output unit 16.

The acquisition unit 11 acquires a plurality of images generated by capturing a product held by a customer with a hand by a plurality of cameras from positions and directions different from each other. Images generated by the plurality of cameras at the same timing can be determined by a time stamp or the like. An input of an image to the acquisition unit 11 may be performed by real time processing or may be performed by batch processing. Which processing to be performed can be determined according to a usage content of a product recognition result, for example.

Herein, the plurality of cameras will be described. In the present example embodiment, the plurality of cameras (two or more cameras) are installed in such a way as to be able to capture a product held by a customer with a hand from a plurality of positions and a plurality of directions. For example, the plurality of cameras may be installed for each product display shelf in positions and directions in which a product taken out from each of the product display shelves is captured. The camera may be installed on a product display shelf, may be installed on a ceiling, may be installed on a floor, may be installed on a wall, and may be installed at the other place. Note that, the example of installing the camera for each product display shelf is merely one example, which is not limited thereto.

The camera may capture a moving image at all times (for example, during business hours), may continuously capture a still image at a time interval longer than a frame interval of a moving image, or may perform the capturing only while a human sensor or the like detects a person present in a predetermined position (in front of a product display shelf, or the like).

Figure 3:
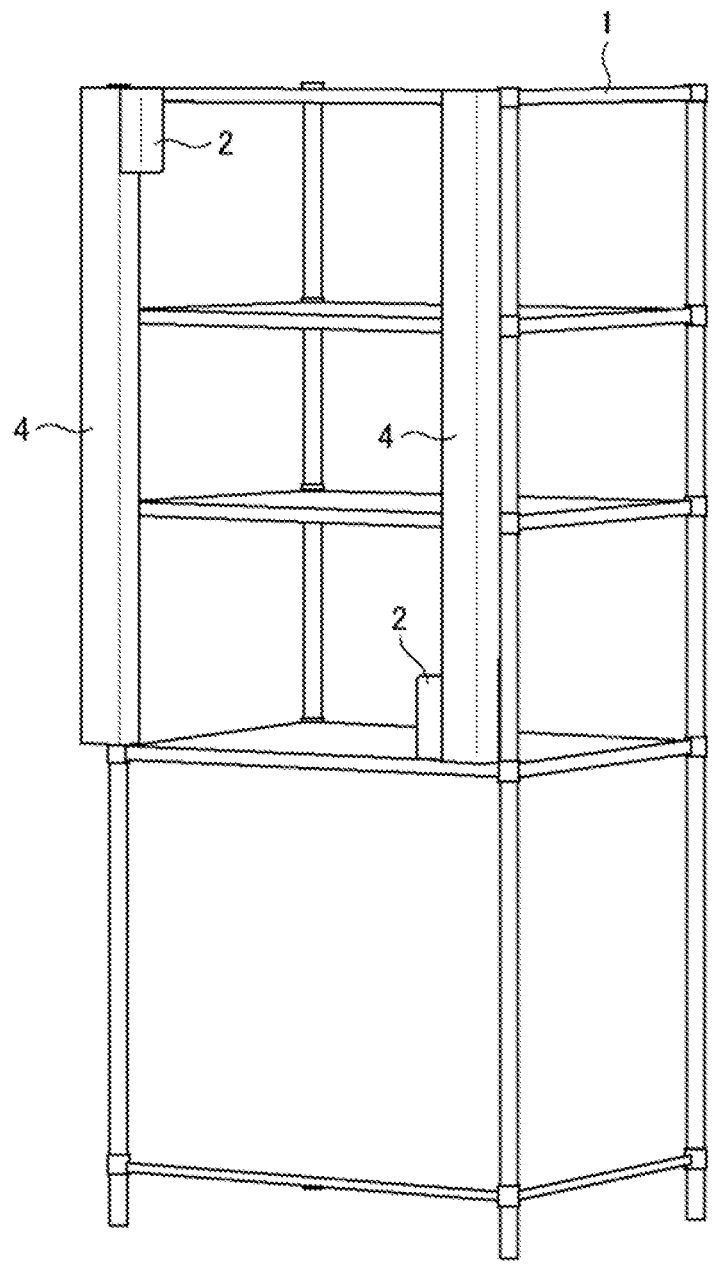
FIG. 3 is a diagram for describing an installation example of a camera according to the present example embodiment.
Figure 4:
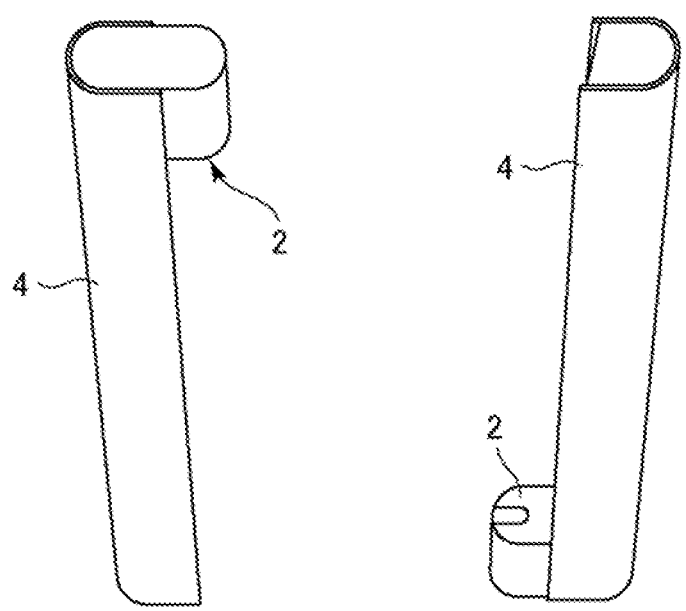
FIG. 4 is a diagram for describing an installation example of the camera according to the present example embodiment.

Herein, one example of camera installation is exemplified. Note that, the camera installation example described herein is merely one example, which is not limited thereto. In an example illustrated in FIG. 3, two cameras 2 are installed for each product display shelf 1. FIG. 4 is a diagram in which a frame 4 in FIG. 3 is extracted. Each of two parts constituting the frame 4 is provided with the camera 2 and illumination (not illustrated).

A light radiation surface of the illumination extends in one direction, and includes a light emission portion and a cover that covers the light emission portion. The illumination radiates light mainly in a direction orthogonal to the extending direction of the light radiation surface. The light emission portion includes a light emitting element such as an LED, and radiates light in a direction not being covered by the cover. Note that, when the light emitting element is an LED, a plurality of LEDs are aligned in a direction (up-down direction in the diagram) in which the illumination extends.

Then, the camera 2 is provided on one end side of the part of the frame 4 extending linearly, and has a capturing range in the direction in which light of the illumination is radiated. For example, in the part of the frame 4 on a left side in FIG. 4, the camera 2 has a lower area and a diagonally lower right area as the capturing range. Further, in the part of the frame 4 on a right side in FIG. 4, the camera 2 has an upper area and a diagonally upper left area as the capturing range.

As illustrated in FIG. 3, the frame 4 is attached to a front frame (or a front surface of a side wall on each of both sides) of the product display shelf 1 constituting a product placement space. One of the parts of the frame 4 is attached to one of the front frames in an orientation in which the camera 2 is located below. The other part of the frame 4 is attached to the other front frame in an orientation in which the camera 2 is located above. Then, the camera 2 attached to one of the parts of the frame 4 captures an upper area and a diagonally upper area in such a way as to include an opening of the product display shelf 1 in the capturing range. On the other hand, the camera 2 attached to the other part of the frame 4 captures a lower area and a diagonally lower area in such a way as to include the opening of the product display shelf 1 in the capturing range. With such a configuration, the two cameras 2 can capture an entire range of the opening of the product display shelf 1. As a result, the two cameras 2 can capture a product (product held by a customer with a hand) taken out from the product display shelf 1.

Figure 5:
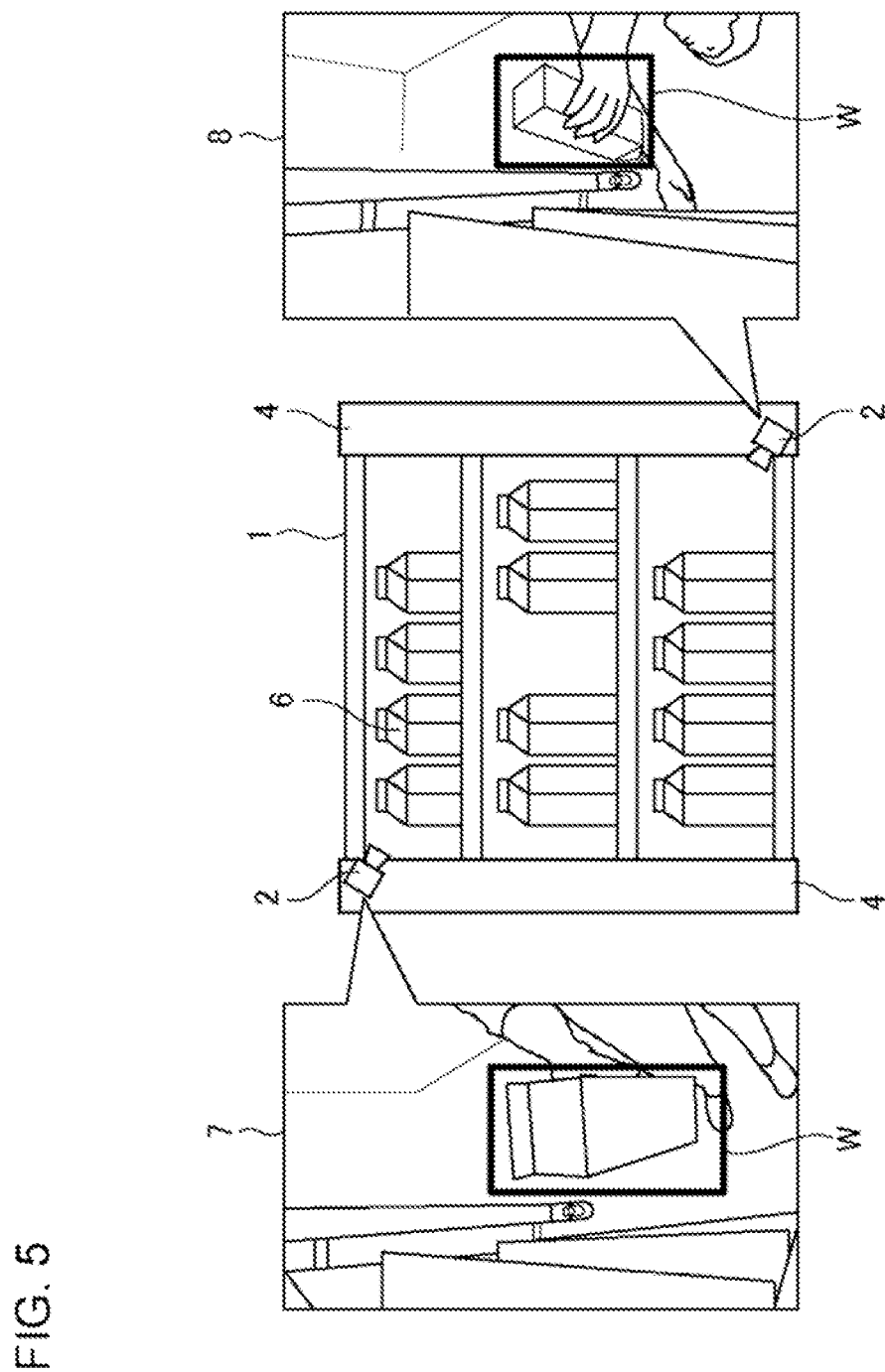
FIG. 5 is a diagram illustrating one example of an image processed by the processing apparatus according to the present example embodiment.

For example, when the configuration illustrated in FIGS. 3 and 4 is adopted, as illustrated in FIG. 5, the two cameras 2 capture a product held by a customer with a hand. As a result, two images 7 and 8 in which the product is captured from a plurality of positions and a plurality of directions are generated.

Note that, hereinafter, a condition that "two cameras capture a product held by a customer with a hand" is a premise. Then, a configuration when "three or more cameras capture a product held by a customer with a hand" will be described as a modification example at the end of the present example embodiment.

Returning to FIG. 2, the detection unit 12 detects an object by detecting a region in which the object is present from each of a plurality of images generated by the plurality of cameras. Since a technique for detecting a region in which an object is present from an image is widely known, detailed description herein will be omitted. Note that, a detected "region in which an object is present" may be a rectangular region including the object and surroundings of the object, or may be a region having a shape along a contour of the object in which only the object is present. For example, when a technique for deciding whether an object is present for each rectangular region in an image is adopted, a detected "region in which an object is present" is a rectangular region W including the object and surroundings of the object as illustrated in FIG. 5. On the other hand, when a technique for detecting a pixel region in which a detection target is present, which is called semantic segmentation or instance segmentation, is adopted, a detected "region in which an object is present" is a region having a shape along a contour of the object in which only the object is present.

The positional information generation unit 13 generates positional information indicating a position in an image, for each detected object. The positional information indicates coordinates in a two-dimensional coordinate system being set on an image, for example. The positional information may indicate a fixed region in an image, or may indicate one point in an image. The positional information indicating a fixed region in an image may indicate a region in which an object is present as described above, for example. The positional information indicating one point in an image may indicate a representative point (such as a central point and a center-of-mass point) in a region in which an object is present as described above, for example.

The product kind-related information generation unit 14 generates, based on an image, product kind-related information that determines a product kind, for each detected object. The product kind-related information according to the present example embodiment is product kind identification information (such as a product name and a product code) that identifies a plurality of product kinds from one another.

A technique for recognizing a product kind of an object included in an image is widely known, and various techniques can be adopted in the present example embodiment. For example, the product kind-related information generation unit 14 may recognize a product kind of an object, based on a classifier generated in advance by machine learning or the like and an image of a "region in which the object is present" described above. In addition, the product kind-related information generation unit 14 may recognize a product kind of an object by pattern matching that verifies a template image of an appearance of each product being prepared in advance with an image of a "region in which the object is present" described above.

The acquisition unit 11, the detection unit 12, the positional information generation unit 13, and the product kind-related information generation unit 14 that have been described above generate information as illustrated in FIGS. 6 and 7.

First object information illustrated in FIG. 6 indicates positional information and product kind-related information about each of a plurality of objects detected from an image being generated by a first camera. In FIG. 6, "1-01" and "1-02" are serial numbers for identifying the plurality of objects detected from the image from each other.

Second object information illustrated in FIG. 7 indicates positional information and product kind-related information about each of a plurality of objects detected from an image being generated by a second camera. In FIG. 7, "2-01" and "2-02" are serial numbers for identifying the plurality of objects detected from the image from each other.

Returning to FIG. 2, the extraction unit 15 extracts a group of a plurality of objects detected from images being generated by cameras different from each other, the group of the plurality of objects having pieces of positional information that satisfy a positional condition and having pieces of product kind-related information that satisfy a product kind condition. In a case of an example of "capturing a product held by a customer with a hand by two cameras", the extraction unit 15 extracts a pair of a first object that is an object detected from an image being generated by the first camera and a second object that is an object detected from an image being generated by the second camera, the pair of the first object and the second object having pieces of positional information that satisfy a positional condition and having pieces of product kind-related information that satisfy a product kind condition. The extraction unit 15 performs the extraction processing, based on the information as illustrated in FIGS. 6 and 7.

The extraction by the extraction unit 15 indicates extraction of an object in which an analysis result of an image generated by the first camera and an analysis result of an image generated by the second camera match (positions match, appearances match, or the like).

First, a positional condition will be described. The positional condition is that a position of the first object in an image generated by the first camera and a position of the second object in an image generated by the second camera satisfy a positional relationship when the first object and the second object are the same subject.

One example of the positional condition is that a "position in which the first object may be present in a three-dimensional space" estimated from "setting information about the first camera" and a "position of the first object in an image generated by the first camera", and a "position in which the second object may be present in the third-dimensional space" estimated from "setting information about the second camera", a "position of the second object in an image generated by the second camera", and a "relative relationship between the first camera and the second camera" match (satisfy a positional relationship when the first object and the second object are the same subject). Details of a technique for deciding whether such a positional condition is satisfied are not particularly limited, and various techniques can be adopted. Hereinafter, one example will be described, which is not limited thereto.

For example, usage of an epipolar line is conceivable. First, a line (epipolar line) acquired by projecting, in an image generated by the second camera, a line passing through the first camera and a predetermined point in an image generated by the first camera, based on setting information (such as a focal distance and an angle of view) about the first camera, setting information (such as a focal distance and an angle of view) about the second camera, a relative relationship (such as a relative positional relationship and a relative orientation relationship) between the first camera and the second camera, and the like. A position in a second image in which the first object may be present can be acquired by setting the predetermined point described above, based on a position of the first object in the image generated by the first camera. When the second object is present in the position in the second image in which the first object may be present, it can be decided that a positional condition between the first object and the second object is satisfied (the positions in the image match).

Next, a product kind condition will be described. As described above, product kind-related information according to the present example embodiment is product kind identification information determined based on a feature value of an appearance of an object. Then, a product kind condition according to the present example embodiment is that product kind identification information about the first object and product kind identification information about the second object coincide with each other (recognition results of product kinds coincide with each other).

Returning to FIG. 2, the product recognition result output unit 16 outputs a product recognition result (product kind identification information) of the first object or the second object for each pair (group) extracted by the extraction unit 15. In a case of the present example embodiment, the pair (group) extracted by the extraction unit 15 satisfies the product kind condition that "product kind identification information about the first object and product kind identification information about the second object coincide with each other", and thus the product recognition result of the first object and the product recognition result of the second object coincide with each other.

Note that, in the present example embodiment, a content of subsequent processing on a product recognition result output from the product recognition result output unit 16 is not particularly limited.

For example, a product recognition result may be used in settlement processing in a store system that eliminates settlement processing (such as product registration and payment) at a cash register counter as disclosed in Non-Patent Documents 1 and 2. Hereinafter, one example will be described.

First, a store system registers an output product recognition result (product kind identification information) in association with information that determines a customer holding the product with a hand. For example, a camera that captures a face of a customer holding a product with a hand may be installed in a store, and the store system may extract a feature value of an appearance of a face of the customer from an image generated by the camera. Then, the store system may register product kind identification information about the product held by the customer with the hand and other product information (such as a unit price and a product name) in association with the feature value of the appearance of the face (information that determines the customer). The other product information can be acquired from a product master (information in which the product kind identification information and the other product information are associated with each other) stored in advance in the store system.

In addition, customer identification information (such as a membership number and a name) about a customer and a feature value of an appearance of a face may be registered in advance in association with each other in any place (such as the store system and a center server). Then, when the store system extracts a feature value of an appearance of a face of a customer from an image including the face of the customer holding a product with a hand, the store system may determine customer identification information about the customer, based on the information being registered in advance. Then, the store system may register product kind identification information about the product held by the customer with the hand and other product information in association with the determined customer identification information.

Further, the store system computes a settlement amount, based on a registration content, and performs settlement processing. For example, the settlement processing is performed at a timing at which a customer exits from a gate, a timing at which a customer goes outside a store from an exit, and the like. Detection of the timings may be achieved by detecting a customer who exits from a store by an image generated by a camera installed at a gate or an exit, may be achieved by inputting customer identification information about a customer who exits from a store to an input apparatus (such as a reader that performs short-range wireless communication) installed at a gate or an exit, or may be achieved by another technique. Details of the settlement processing may be settlement processing by a credit card, based on credit card information being registered in advance, may be settlement based on money being charged in advance, or may be other.

As another usage scene of a product recognition result output from the product recognition result output unit 16, a preference investigation of a customer, a marketing investigation, and the like are exemplified. For example, by registering a product held by each customer with a hand in association with each customer, a product that interests each customer and the like can be analyzed. Further, by registering a fact that a customer holds a product with a hand for each product, which product interests a customer can be analyzed. Furthermore, by estimating an attribute (such as sex, age, and nationality) of a customer by using a conventional image analysis technique and registering the attribute of the customer holding each product with a hand, the attribute of the customer who is interested in each product can be analyzed.

Figure 8:
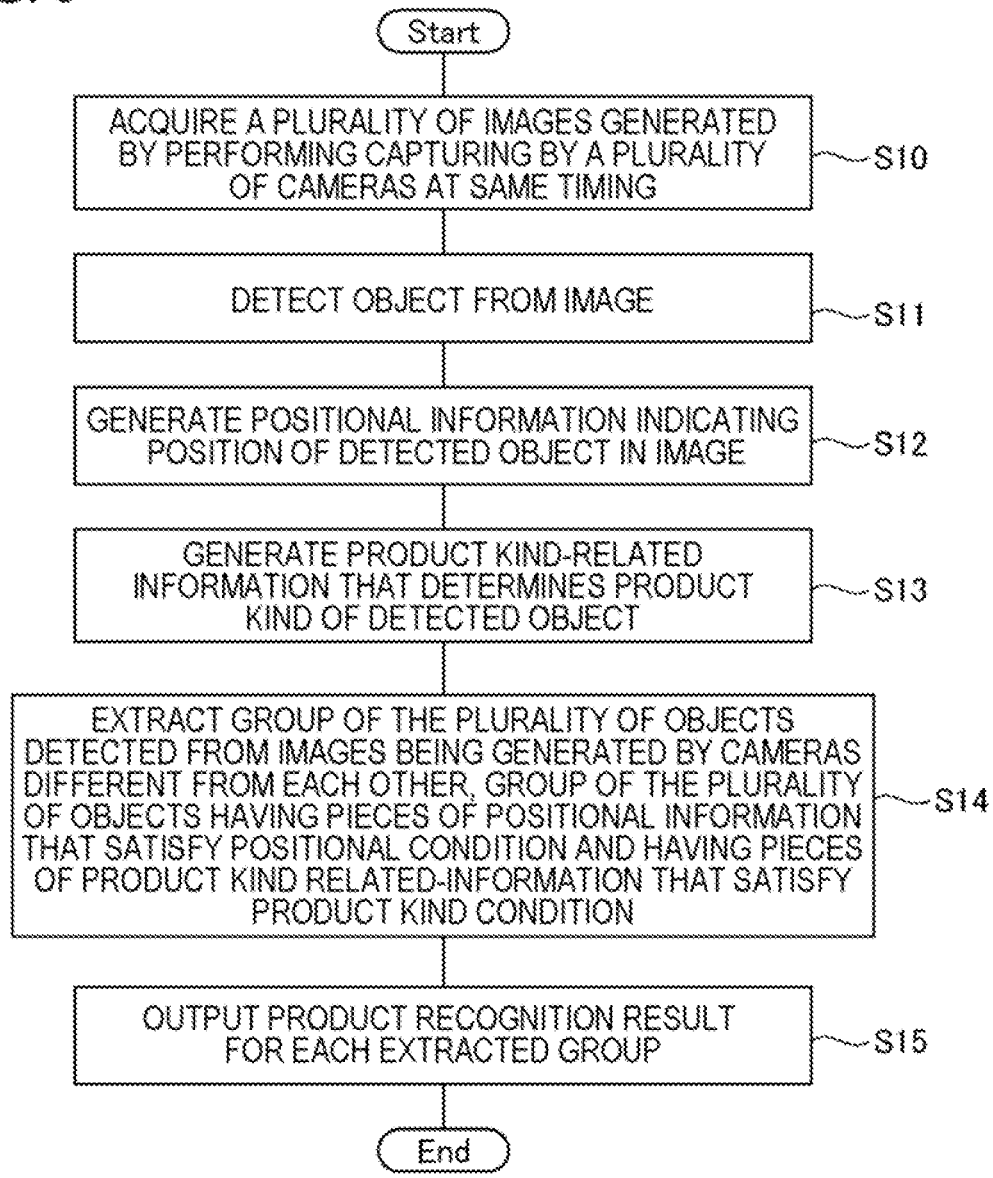
FIG. 8 is a flowchart illustrating one example of a flow of processing of the processing apparatus according to the present example embodiment.

Next, one example of a flow of processing of the processing apparatus 10 will be described by using a flowchart in FIG. 8.

First, the acquisition unit 11 acquires two images generated by performing capturing by the first camera and the second camera at the same timing (S10). The first camera and the second camera are installed in such a way as to capture a product held by a customer with a hand from positions and directions different from each other.

Next, the detection unit 12 analyzes each of the two images, and detects an object from each of the images (S11). Next, the positional information generation unit 13 generates positional information indicating a position in the image, for each of the objects detected in S11 (S12). Further, the product kind-related information generation unit 14 generates, based on the image, product kind-related information that determines a product kind, for each of the detected objects (S13). Note that, a processing order of S12 and S13 is not limited to the illustrated order.

By the processing described above, the information as illustrated in FIGS. 6 and 7 is generated. The first object information illustrated in FIG. 6 indicates positional information and product kind-related information about each of a plurality of objects detected from the image being generated by the first camera. The second object information illustrated in FIG. 7 indicates positional information and product kind-related information about each of a plurality of objects detected from the image being generated by the second camera.

Next, the extraction unit 15 extracts a pair (group) of a first object that is an object detected from the image being generated by the first camera and a second object that is an object detected from the image being generated by the second camera, the pair of the first object and the second object having pieces of positional information that satisfy a positional condition and having pieces of product kind-related information that satisfy a product kind condition (S14).

Then, the product recognition result output unit 16 outputs a product recognition result (product kind identification information) of the first object or the second object for each pair (group) extracted in S14 (S15).

Advantageous Effect

The processing apparatus 10 according to the present example embodiment described above can perform product recognition processing, based on an image generated by a plurality of cameras that capture a product held by a customer with a hand from positions and directions different from each other. Then, only a product recognition result of an object in which analysis results of the images generated by the plurality of cameras match (positions match, appearances match, or the like) can be output, and the other product recognition result can be rejected, for example. The other product recognition result is a product recognition result of the first object and the second object that are not extracted by the extraction unit 15.

The processing apparatus 10 according to the present example embodiment can suppress false recognition and accurately recognize a product held by a customer with a hand by providing such a condition that "it holds true when analysis results of images generated by a plurality of cameras match (positions match, appearances match, or the like)".

Modification Example

As described above, in the present example embodiment, three or more cameras may capture a product held by a customer with a hand from positions and directions different from one another.

In this case, the processing apparatus 10 may output only a product recognition result of an object in which all analysis results of images generated by N (N is an integer of three or more) cameras match (positions match, appearances match, or the like), and may reject the other product recognition result, for example. In this case, the extraction unit 15 extracts a group of a plurality of objects detected from N images being generated by the N cameras, the group to which N objects belong having pieces of positional information that satisfy a positional condition and having pieces of product kind-related information that satisfy a product kind condition. The condition is different from the condition described above in a point that the condition of the number of objects (members) belonging to a group is further added.

In addition, the processing apparatus 10 may output only a product recognition result of an object in which at least M (M is an integer of two or more, M is less than N) analysis results among N (N is an integer of three or more) analysis results of images generated by N cameras match (positions match, appearances match, or the like), and may reject the other product recognition result, for example. In this case, the extraction unit 15 extracts a group of a plurality of objects detected from N images being generated by the N cameras, the group to which M or more objects belong having pieces of positional information that satisfy a positional condition and having pieces of product kind-related information that satisfy a product kind condition. The condition is different from the condition described above in a point that the condition of the number of objects (members) belonging to a group is further added.

In addition, the processing apparatus 10 may output only a product recognition result of an object in which a predetermined proportion or more of analysis results among analysis results of images generated by N (N is an integer of three or more) cameras match (positions match, appearances match, or the like), and may reject the other product recognition result, for example. In this case, the extraction unit 15 extracts a group of a plurality of objects detected from N images being generated by the N cameras, the group to which a predetermined proportion or more of N objects belong having pieces of positional information that satisfy a positional condition and having pieces of product kind-related information that satisfy a product kind condition. The condition is different from the condition described above in a point that the condition of the number of objects (members) belonging to a group is further added.

Also in the modification examples, the advantageous effect described above is achieved. Further, by increasing the number of cameras and setting the condition as described above, even when a situation where a product is in a blind spot due to a hand of a person or something and the product cannot be captured by some cameras, it can hold true as long as analysis results of images generated by a plurality of the other cameras match. As a result, convenience further improves.

Second Example Embodiment

The present example embodiment is different from the first example embodiment in a product kind condition. Specifically, a product kind condition in the present example embodiment is that "product kinds coincide", and a "relationship between a feature portion of a product that is determined based on a feature value of an appearance of an object extracted from an image being generated by a first camera and faces the first camera, and a feature portion of a product that is determined based on a feature value of an appearance of an object extracted from an image being generated by a second camera and faces the second camera satisfies an orientation condition".

For example, as in the examples in FIGS. 3 to 5, when the first camera and the second camera perform capturing in such a way as to sandwich a product, and capturing directions are different by about 180°, the orientation condition described above is a "reverse relationship". In other words, a condition that a feature portion of a product facing the first camera and a feature portion of a product facing the second camera are in a reverse relationship in the product is the orientation condition.

For example, as illustrated in FIG. 9, a feature value extracted from each of images when capturing is performed from a plurality of directions is registered in advance for each product kind. Note that, a feature value when capturing is performed from six directions (from the front, from the rear, from above, from below, from the right, and from the left) is registered in FIG. 9, but the number of capturing directions is not limited to this.

Further, as illustrated in FIG. 10, a relationship of a capturing direction between the first camera and the second camera is registered in advance. The relationship indicates a relationship that, "when the first camera captures a product from a certain direction, which direction the second camera captures the product from".

Then, an extraction unit 15 can decide whether the orientation condition described above is satisfied, based on the information.

Specifically, first, a product kind-related information generation unit 14 determines a direction from which capturing is performed when a feature portion of a product to be captured faces the first camera, by verifying a feature value of an appearance of an object extracted from an image being generated by the first camera with the feature value illustrated in FIG. 9. Further, the product kind-related information generation unit 14 determines a direction from which capturing is performed when a feature portion of a product to be captured faces the second camera, by verifying a feature value of an appearance of an object extracted from an image being generated by the second camera with the feature value illustrated in FIG. 9. The determination processing may be achieved by using a classifier generated by machine learning, may be achieved by pattern matching, or may be achieved by another technique.

Then, when a capturing direction in which the feature portion facing the first camera is captured and a capturing direction in which the feature portion facing the second camera is captured satisfy the relationship illustrated in FIG. 10, the extraction unit 15 decides that the orientation condition described above is satisfied.

Another configuration of a processing apparatus 10 according to the present example embodiment is similar to that in the first example embodiment. Note that, the processing apparatus 10 according to the present example embodiment can also adopt a modification example in which three or more cameras capture a product held by a customer with a hand from positions and directions different from one another. For example, when a relationship of a capturing direction among three or more cameras is registered in advance, a similar advantageous effect is achieved by processing similar to that described above.

The processing apparatus 10 according to the present example embodiment achieves an advantageous effect similar to that in the first example embodiment. Further, the processing apparatus 10 according to the present example embodiment is acquired by further adding the orientation condition as described above in consideration of a feature that, "when a plurality of cameras capture a product from positions and directions different from each other, a feature portion of the product that appears in an image may vary depending on a direction in which capturing is performed". By providing the orientation condition, false recognition can be further suppressed, and a product held by a customer with a hand can be more accurately recognized.

Third Example Embodiment

Product kind-related information according to the present example embodiment is a feature value of an appearance of an object extracted from an image. Then, a product kind condition is that a similarity degree of a feature value of the appearance described above is equal to or more than a reference value.

Another configuration of a processing apparatus 10 according to the present example embodiment is similar to that in the first example embodiment. The processing apparatus 10 according to the present example embodiment achieves an advantageous effect similar to that in the first example embodiment.

Modification Example

Herein, modification examples applicable to all of the example embodiments will be described. In the example embodiments described above, the positional information generation unit 13 generates positional information for each detected object, the product kind-related information generation unit 14 generates product kind-related information for each detected object, and the extraction unit 15 then extracts a group of a plurality of objects that satisfy a positional condition and a product kind condition.

In a first modification example, after the positional information generation unit 13 generates positional information for each detected object, the extraction unit 15 extracts a group of a plurality of objects that satisfy a positional condition. Then, subsequently, the product kind-related information generation unit 14 decides whether the plurality of objects belonging to the extracted group satisfy a product kind condition. Then, the extraction unit 15 extracts a group of a plurality of objects decided to satisfy the product kind condition.

In this case, the product kind-related information generation unit 14 may perform processing of determining product kind identification information about each object, based on a feature value of an appearance of each of the plurality of objects. Then, the product kind-related information generation unit 14 may decide that a combination of objects having the pieces of determined product kind identification information that coincide with each other satisfies the product kind condition.

As an example of other processing, the product kind-related information generation unit 14 may determine product kind identification information about the first object, based on a feature value of an appearance of the first object, and may then decide whether a feature value of an appearance of another object matches a "feature value of an appearance of a product identified by the determined product kind identification information about the first object". Then, when they match, the product kind-related information generation unit 14 may decide that the product kind condition is satisfied. In a case of the processing example, processing of determining product kind identification information by verification with a feature value of each of a plurality of types of product kinds is performed only on the first object and is not performed on the another object. Thus, a processing load on a computer is reduced.

Note that, in the present specification, "acquisition" includes at least any one of "acquisition of data stored in another apparatus or a storage medium by its own apparatus (active acquisition)", based on a user input or an instruction of a program, such as reception by making a request or an inquiry to another apparatus and reading by accessing to another apparatus or a storage medium, "inputting of data output to its own apparatus from another apparatus (passive acquisition)", based on a user input or an instruction of a program, such as reception of data to be distributed (transmitted, push-notified, or the like) and acquisition by selection from among received data or received information, and "generation of new data by editing data (such as texting, sorting of data, extraction of a part of data, and change of a file format) and the like, and acquisition of the new data".

The invention of the present application is described above with reference to the example embodiments (examples), but the invention of the present application is not limited to the example embodiments (examples) described above. Various modifications that can be understood by those skilled in the art can be made to the configuration and the details of the invention of the present application within the scope of the invention of the present application.

A part or the whole of the above-described example embodiments may also be described as in supplementary notes below, which is not limited thereto.

1. A processing apparatus, including:
    an acquisition unit that acquires a plurality of images generated by capturing a product held by a customer with a hand by a plurality of cameras from directions different from each other;
    a detection unit that detects an object from each of the plurality of images;
    a positional information generation unit that generates positional information indicating a position in the image, for the each detected object;
    a product kind-related information generation unit that generates, based on the image, product kind-related information that determines a product kind, for the each detected object;
    an extraction unit that extracts a group of a plurality of objects detected from the images being generated by the cameras different from each other, the group of the plurality of objects having pieces of the positional information that satisfy a positional condition with each other and also having pieces of the product kind-related information that satisfy a product kind condition with each other; and
    a product recognition result output unit that outputs a product recognition result for the each extracted group.

2. The processing apparatus according to supplementary note 1, wherein
    the positional condition is that a position of an object in the image satisfies a positional relationship when an object in the image is a same subject.

3. The processing apparatus according to supplementary note 2, wherein
the positional condition is that a position in which a first object may be present in a three-dimensional space estimated from setting information about a first camera and a position of the first object in the image generated by the first camera, and a position in which a second object may be present in the third-dimensional space estimated from setting information about another camera, a position of the second object in the image generated by the another camera, and a relative relationship between the first camera and the another camera satisfy a positional relationship when the first object and the second object are a same subject.

4. The processing apparatus according to any of supplementary notes 1 to 3, wherein
the product kind-related information is a feature value of an appearance of the object extracted from the image, and
the product kind condition is that a similarity degree of a feature value of the appearance is equal to or more than a reference value.

5. The processing apparatus according to any of supplementary notes 1 to 3, wherein
the product kind-related information is product kind identification information determined based on a feature value of an appearance of the object extracted from the image, and
the product kind condition is that the product kind identification information coincides.

6. The processing apparatus according to supplementary note 5, wherein
the product kind condition is that
the product kind coincides, and
a relationship between a feature portion of a product that is determined based on a feature value of an appearance of the object extracted from the image being generated by a first camera and faces the first camera, and a feature portion of a product that is determined based on a feature value of an appearance of the object extracted from the image being generated by another camera and faces the another camera satisfies an orientation condition.

7. A processing method, including,
by a computer:
acquiring a plurality of images generated by capturing a product held by a customer with a hand by a plurality of cameras from directions different from each other;
detecting an object from each of the plurality of images;
generating positional information indicating a position in the image, for the each detected object;
generating, based on the image, product kind-related information that determines a product kind, for the each detected object;
extracting a group of a plurality of objects detected from the images being generated by the cameras different from each other, the group of the plurality of objects having pieces of the positional information that satisfy a positional condition with each other and also having pieces of the product kind-related information that satisfy a product kind condition with each other; and
outputting a product recognition result for the each extracted group.

8. A program causing a computer to function as:
an acquisition means for acquiring a plurality of images generated by capturing a product held by a customer with a hand by a plurality of cameras from directions different from each other;
a detection unit that detects an object from each of the plurality of images;
a positional information generation unit that generates positional information indicating a position in the image, for the each detected object;
a product kind-related information generation unit that generates, based on the image, product kind-related information that determines a product kind, for the each detected object;
an extraction unit that extracts a group of a plurality of objects detected from the images being generated by the cameras different from each other, the group of the plurality of objects having pieces of the positional information that satisfy a positional condition with each other and also having pieces of the product kind-related information that satisfy a product kind condition with each other; and
a product recognition result output unit that outputs a product recognition result for the each extracted group.

What is claimed is:

1. A processing apparatus comprising:
at least one memory storing one or more instructions; and
at least one processor configured to execute the one or more instructions to:
acquire, by the at least one processor executing the instructions and from a first camera, a first image captured by the first camera from a first direction, the first image including a product held by a customer with a hand;
acquire, by the at least one processor executing the instructions and from a second camera, a second image captured by the second camera from a second direction different from the first direction, the second image including the product held by the customer with the hand;
detect, by the at least one processor executing the instructions, a first object from the first image;
detect, by the at least one processor executing the instructions, a second object from the second image;
generate, by the at least one processor executing the instructions, positional information indicating a position of the first object in the first image and a position of the second object in the second image;
generate, by the at least one processor executing the instructions and based on the first image and the second image, product kind-related information indicating a product kind of the first object and a product kind of the second object;
extract, by the at least one processor executing the instructions, a group of the first object and the second object that satisfies a positional condition and a product kind condition, the positional condition defined with respect to the position of the first object in the first image and the position of the second object in the second image, the product kind condition being defined with respect to the product kind of the first object and the product kind of the second object; and
output, by the at least one processor executing the instructions, a product recognition result of the first object and the second object of the extracted group.

2. The processing apparatus according to claim 1, wherein the positional condition is that a position of the first object in the first image satisfies a positional relationship when the second object in the second image are a same subject.

3. The processing apparatus according to claim 2, wherein the positional condition is that a position in which the first object may be present in a three-dimensional space estimated from setting information about a first camera and the position of the first object in the first image, and a position in which the second object may be present in the third-dimensional space estimated from setting information about the second camera, the position of the second object in the second image, and a relative relationship between the first camera and the another camera satisfy the positional relationship when the first object and the second object are the same subject.

4. The processing apparatus according to claim 1, wherein the product kind-related information is a feature value of an appearance of each of the first object and the second object, and
the product kind condition is that a similarity degree of the feature value is equal to or more than a reference value.

5. The processing apparatus according to claim 1, wherein the product kind-related information is product kind identification information determined based on a feature value of an appearance of each of the first object and the second object, and
the product kind condition is that the product kind identification information coincides.

6. The processing apparatus according to claim 5, wherein the product kind condition is that
the product kind coincides, and
a relationship between a feature portion of a first product determined based on the feature value of the appearance of the first object, and a feature portion of a second product determined based on the feature value of the appearance of the second object satisfies an orientation condition.

7. A processing method comprising:
acquiring, by at least one processor executing instructions stored on at least one memory, and from a first camera, a first image captured by the first camera from a first direction, the first image including a product held by a customer with a hand;
acquiring, by the at least one processor executing the instructions and from a second camera, a second image captured by the second camera from a second direction different from the first direction, the second image including the product held by the customer with the hand;
detecting, by the at least one processor executing the instructions, a first object from the first image;
detecting, by the at least one processor executing the instructions, a second object from the second image;
generating, by the at least one processor executing the instructions, positional information indicating a position of the first object in the first image and a position of the second object in the second image;
generating, by the at least one processor executing the instructions and based on the first image and the second image, product kind-related information indicating a product kind of the first object and a product kind of the second object;
extracting, by the at least one processor executing the instructions, a group of the first object and the second object that satisfies a positional condition and a product kind condition, the positional condition defined with respect to the position of the first object in the first image and the position of the second object in the second image, the product kind condition being defined with respect to the product kind of the first object and the product kind of the second object; and
outputting, by the at least one processor executing the instructions, a product recognition result of the first object and the second object of the extracted group.

8. A non-transitory storage medium storing a program including one or more instructions executable by at least one processor of a computer to perform processing comprising:
acquiring, by the at least one processor executing the instructions and from a first camera, a first image captured by the first camera from a first direction, the first image including a product held by a customer with a hand;
acquiring, by the at least one processor executing the instructions and from a second camera, a second image captured by the second camera from a second direction different from the first direction, the second image including the product held by the customer with the hand;
detecting, by the at least one processor executing the instructions, a first object from the first image;
detecting, by the at least one processor executing the instructions, a second object from the second image;
generating, by the at least one processor executing the instructions, positional information indicating a position of the first object in the first image and a position of the second object in the second image;
generating, by the at least one processor executing the instructions and based on the first image and the second image, product kind-related information indicating a product kind of the first object and a product kind of the second object;
extracting, by the at least one processor executing the instructions, a group of the first object and the second object that satisfies a positional condition and a product kind condition, the positional condition defined with respect to the position of the first object in the first image and the position of the second object in the second image, the product kind condition being defined with respect to the product kind of the first object and the product kind of the second object; and
outputting, by the at least one processor executing the instructions, a product recognition result of the first object and the second object of the extracted group.

9. The processing apparatus according to claim 1, wherein the at least one memory stores correspondence information indicating a relationship about which side of a product is captured by the second camera in a case where the first camera captures each side of the product, and
the at least one processor is further configured to execute the one or more instructions to:
determine, as a first side, which side of the product is captured by the first camera based on the first image;
determine, as a second side, which side of the product is captured by the second camera based on the second image;
judge if a relationship between the first side and the second side satisfies the relationship indicated in the correspondence information; and output the product recognition result when the relationship between the first side and the second side satisfies the relationship indicated in the correspondence information.

* * * * *